United States Patent
Asfur

(10) Patent No.: US 8,019,923 B2
(45) Date of Patent: Sep. 13, 2011

(54) MEMORY CARD ADAPTER

(75) Inventor: Mahmud Asfur, Bat Yam (IL)

(73) Assignee: Sandisk IL Ltd., Kfar Saba (IL)

( * ) Notice: Subject to any disclaimer, the term of this patent is extended or adjusted under 35 U.S.C. 154(b) by 112 days.

(21) Appl. No.: 12/325,734

(22) Filed: Dec. 1, 2008

(65) Prior Publication Data

US 2010/0138580 A1 Jun. 3, 2010

(51) Int. Cl.
*H05K 7/10* (2006.01)

(52) U.S. Cl. ......................... 710/301; 710/302

(58) Field of Classification Search .................. 710/301, 710/302
See application file for complete search history.

(56) References Cited

U.S. PATENT DOCUMENTS

| | | | | |
|---|---|---|---|---|
| 6,550,684 | B1 * | 4/2003 | Zuin et al. | 235/486 |
| 6,802,448 | B2 * | 10/2004 | Bricaud et al. | 235/451 |
| 7,657,687 | B2 * | 2/2010 | Ootsuka et al. | 710/305 |
| 2005/0197017 | A1 * | 9/2005 | Chou et al. | 439/660 |
| 2007/0026740 | A1 | 2/2007 | Chen | |
| 2007/0145152 | A1 | 6/2007 | Jogand-Coulomb et al. | |
| 2008/0288669 | A1 * | 11/2008 | Tong et al. | 710/18 |

* cited by examiner

Primary Examiner — Mark Rinehart
Assistant Examiner — Jeremy S Cerullo
(74) Attorney, Agent, or Firm — Toler Law Group

(57) ABSTRACT

A card adapter includes a first memory card interface configured to be connected to a first memory card. The first memory card is associated with a first file system. The card adapter includes a second memory card interface that is configured to be connected to a second memory card. The second memory card is associated with a second file system. The card adapter also includes a host interface configured to connect to a host. The card adapter includes a controller operatively interposed between the first and second memory card interfaces and the host interface. The controller is configured to control the first memory card interface and the second memory card interface to control connections between each memory card that is connected thereto with the host. The controller is also configured to operate in each of two selectable modes. In a first mode the controller is operative to emulate a virtual file system that presents to the host the first file system and the second file system as a unified image. In a second mode, the controller presents to the host either the first file system of the first memory card connected to the first memory card interface or the second file system of the second memory card connected to the second memory card interface. The card adapter also includes a mode switch coupled to the controller and configured to receive a user selection of one of the two selectable modes.

20 Claims, 4 Drawing Sheets

MEMORY CARD ADAPTER

FIELD OF THE INVENTION

The present invention relates to memory card adapters. More particularly, the present invention relates to a memory card adapter configured to establish a communication channel between one or more memory cards and a host device.

BACKGROUND

Memory cards have become very popular because of their small size and large storage capacity. There are many types of memory cards in the market, which vary in the storage format, storage capacity, and form factor. Currently, different types of "multi-in-one" card readers exist, which enable memory cards of the same type, or of different types, to exchange data with a host device.

Memory cards known as the Mini Secured Digital ("SD") memory card and Micro SD memory card are exemplary types of memory cards that cannot operate with a card reader directly. The Micro SD memory card form factor for example, though widely used today, is too small and inconvenient for a user to directly mount it onto different types of hosts. In addition, many host devices commonly used today do not support the Micro SD form factor and, therefore, a memory card adapter is required in order for such host devices to use such memory cards.

There are conventional memory card adapters that are adapted to accommodate either a single Mini SD memory card or a single Micro SD memory card. These adapters, which are oftentimes called "micro-SD-to-SD" adapters, are implemented as a hardware component of the same size that requires the same operating voltage as a regular SD memory card. In addition, micro-SD-to-SD adapters are provided with means for converting micro-SD formatted data into SD-formatted data, and vice versa. However, the "micro-SD-to-SD" adapters have several drawbacks. For example, the size of an SD memory card form factor is larger than twice the size of one Micro SD card form factor. As such, the physical space of the memory card adapter is not efficiently exploited.

In addition, current memory card adapters do not support replacement of one memory card with another, for example for extending the available storage capacity. Replacing memory cards, as such, may impact the user experience and may lead to loosing data that is stored on the replaced memory card.

There is therefore a need to address memory card adapters in a way that would make such adapters more useful.

SUMMARY

In view of the foregoing observations and the present needs, it would be advantageous to have a memory card adapter for connecting two or more memory cards to a host. The card adapter may establish a single communication channel between a host and only one memory card (e.g., between the host and a first memory card or between the host and a second memory card), or it may establish a single communication channel between the host and a virtual memory containing content of the two or more memory cards.

A card adapter may include a first memory card interface that is configured to be connected to a first memory card, the first memory card being associated with a first file system; a second memory card interface that is configured to be connected to a second memory card, the second memory card being associated with a second file system; a host interface that is configured to be connected to a host; and a controller for interfacing with the first memory card interface, the second card interface and the host interface to control the first memory card and the second memory card.

The card adapter may have several modes of operation. In one operation mode of the card adapter the controller is operative to emulate a virtual file system that presents to the host the first file system and the second file system as a unified image. In another operation mode of the card adapter the controller is operative to present to the host the first file system or the second file system.

The card adapter may have a third card interface that is connectable to a third memory card, the third memory card being associated with a third file system, and the controller may emulate a virtual file system that presents to the host a unified image of at least two of: the first file system, the second file system and the third file system.

The card adapter may further include a switch that is operatively connected to the controller, the switch being operative to transition between at least two distinct operation modes of the card adapter, each of the operation modes establishes a communication channel between the host and one of the first memory card and the second memory card, or between the host and one of the first memory card, the second memory card, and the third memory card, depending on the use case. Transitions between distinct operation modes of the card adapter may be done using a software application. The switch may affect the transition between the operation modes prior to, after or during the connection of the card adapter to the host. The switch may include circuitry to affect the transition between at least two distinct operation modes of the card adapter, each of the operation modes establishes a communication channel between the host and one of the first memory card and the second memory card, depending on which of the first memory card and the second memory card is connected first to the card adapter and/or to which memory card interface the first memory card or the second memory card is connected.

The card adapter may further include housing for accommodating the first memory card and the second memory card, or the first memory card, the second memory card, and the third memory card. The housing may further include a mechanical ejector for each memory card interface for ejecting the memory cards from the housing/slots.

The card adapter may further include a voltage converter to detect the voltage of the host and the voltage(s) of at least one of the first memory card, the second memory card and the third memory card, and to adapt the voltage provided to these memory cards according to the detected voltage(s).

At least one of the first memory card, the second memory card and the third memory card is compatible with a mini secure digital ("SD") memory card format with a micro-SD memory card format, with a memory stick micro memory card format.

A method for connecting memory cards to a host by using a card adapter includes connecting a first memory card to a first memory card interface of a card adapter, the first memory card being associated with a first file system; connecting a second memory card to a second memory card interface of the card adapter, the second memory card being associated with a second file system; and controlling operation of the first memory card and the second memory card, wherein in a selected operation mode, the controlling includes emulating, by a controller of the card adapter, a virtual file system that presents to the host the first file system and the second file system as a unified image.

The method may further include presenting to the host, by the memory card controller, the first file system or the second file system.

The method may further include providing a third card interface to the card adapter and connecting a third memory card to the card adapter by using the third card interface, the third memory card being associated with a third file system. Controlling may include emulating a virtual file system that represents a unified image of at least two of the first file system, the second file system and the third file system.

The method may further include transitioning between at least two distinct operation modes, each of which operation modes establishes a communication channel between the host and one of the first memory card, the second memory card, and, depending on the use case, the third memory card. The transitioning may be effected depending on the orientation of the memory cards connected to the card adapter. By "depending on the orientation" is meant which memory card is connected first to the card adapter and/or which memory card interface it is connected to.

The method may further include detecting the voltage of the host and the voltage(s) of at least one of the memory cards connected to the card adapter (i.e., the first memory card, the second memory card, and, depending on the use case, the third memory card); and adapting the voltage provided by the card adapter to any of the first memory card, the second memory card, or third memory card according to the detected voltage(s).

Additional features and advantages of the embodiments described are possible as will become apparent from the following drawings and description.

BRIEF DESCRIPTION OF THE DRAWINGS

For a better understanding of the invention with regard to the various embodiments, reference is made to the accompanying drawings, in which like numerals designate corresponding sections or elements throughout, and in which.

DETAILED DESCRIPTION

The embodiments and various aspects thereof are further described in more detail below. The description below is not intended to limit the scope of claims but instead to provide examples of such embodiments. The following discussion therefore presents exemplary embodiments, which include a card adapter that is configured as a memory card adapter that can interface with two memory cards and establish a single communication channel with a host. Such embodiments may be implemented as software, firmware, or hardware, or any combination thereof.

According to the present disclosure a physical space of a memory card adapter (e.g., mini-SD-to-SD card adapter) which is traditionally unused is used to accommodate additional one or more memory cards. The card adapter is not limited to interface with a particular memory card format as it is capable of adapting different memory card formats to a data format used by a host. According to one example, the card adapter may adapt two Micro Memory Stick card formatted data to the Memory Stick duo specification, and vice versa. According to another example, the card adapter may adapt two Micro SD card formatted data to the SD specification, and vice versa.

A card adapter includes a plurality of memory card interfaces for interfacing with a plurality of memory cards, each of the memory cards having its own file system, and a host interface for interfacing a host of the memory cards. A controller of the card adapter interfaces with the plurality of memory card interfaces and with the host interface and controls operation of the memory cards. The card adapter may have several modes of operation, one of which involves emulating on the host, by the controller, a virtual file system that represents a unified image of the file systems of two or more memory cards. In another mode of operation of the card adapter the controller presents to the host a file system of only one memory card.

Figure 1:
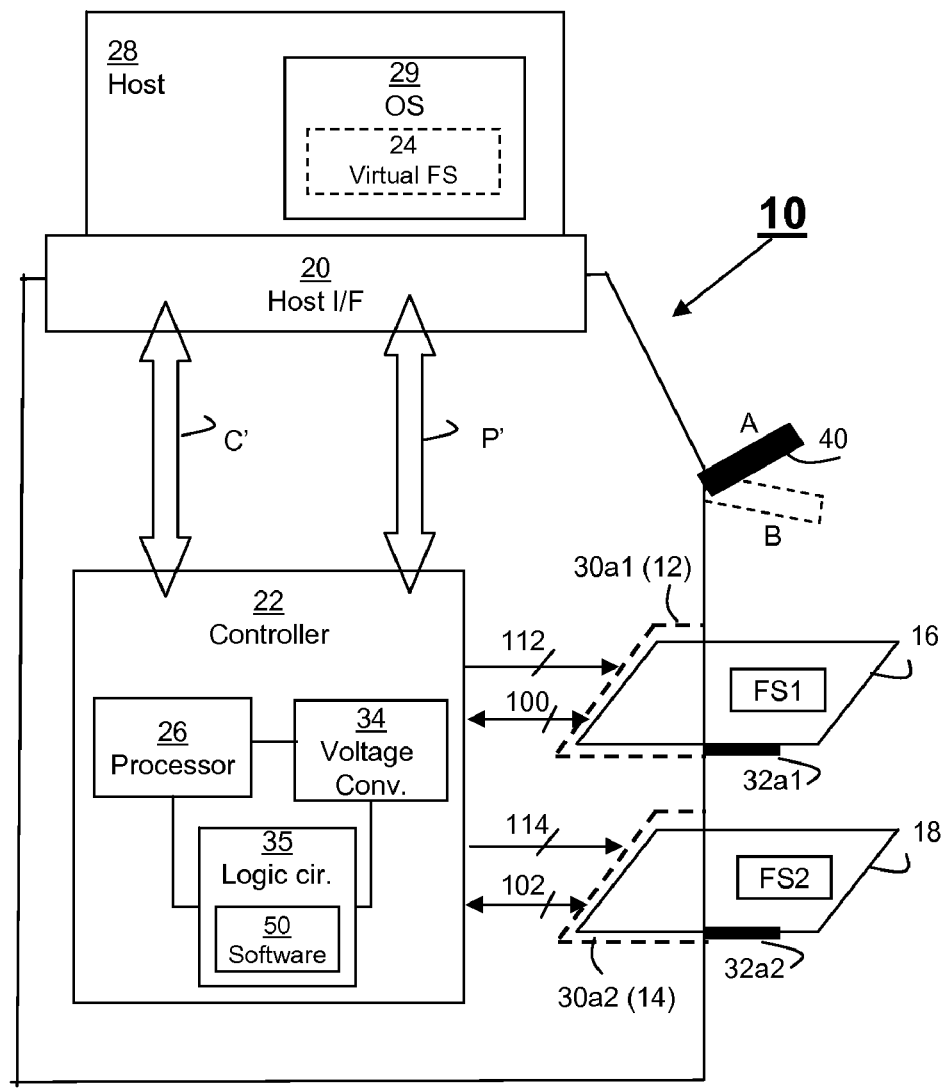
FIG. 1 is a block diagram of a card adapter according to an example embodiment.

FIG. 1 is a block diagram of a card adapter 10 according to an example embodiment. Card adapter 10 may functionally accommodate two memory cards and convert their data from one data format to another. For example, the two memory cards may be, for example, Micro-SD memory cards and card adapter 10 may convert Micro-SD formatted data into SD-formatted data, and vice versa. According to another example card adapter 10 may functionally accommodate two Micro Memory (m2) Stick memory cards and card adapter 10 may convert Micro Memory Stick card formatted data into the Memory Stick duo specification, and vice versa.

According to a non-limiting example, the form factor of card adapter 10 that is designed to accommodate two Micro-SD memory cards may be 24 mm×32 mm, and each socket of card adapter 10 may be 2.1 mm thick. The form factor of card adapter 10 that is designed to accommodate two Micro Memory (m2) Stick memory cards may be 50 mm×21.5 mm long, and each socket may be 2.8 mm thick.

Card adapter 10 typically includes a host interface 20 for interfacing with a host, for example with host 28, via data and control lines C'. Card adapter 10 also includes a first memory card interface 12 and a second memory card interface 14. Each of the first card interface 12 and second card interface 14 is configured to mechanically accommodate and electrically interoperate with a memory card. For example, first memory card interface 12 and memory card interface 14 are configured to mechanically accommodate and electrically interoperate with memory card 16 and memory card 18, respectively.

Card adapter 10 is configured to be removably connected to host 28 by plugging a connector of card adapter 10 into a connector of host 28. Communication between card adapter 10 and host 28 may be established via data and control lines C'. Data and control lines C' may conform to any known communication protocol. For example, data and control lines C' may conform to the USB protocol. Card adapter 10 may include a USB connector, an optical connector, etc. Card adapter 10 is typically not provided with a power source. Instead, the electrical power required to operate card adapter 10 may be provided to the card adapter from host 28 via power line(s) P' or via any other means known in the art.

A controller 22 manages operation of memory cards 16 and 18 via data and control lines 100 and 102, respectively, and establishes a communication channel with host 28 via host interface 20. Controller 22 controls all the data transfers to/from memory cards 16 and 18 and all data transfer to/from host 28 by controlling, for example, "read", "write" and "erase" operations, and so on.

Data is typically written to and/or read from memory cards 16 and 18 one memory card at a time, but this is not necessarily so. That is, controller 22 may use a procedure that enables it to simultaneously manage more than one memory card. For example, responsive to controller 22 receiving a command from host 28, controller 22 may read data from one memory card (e.g., from memory card 16) and then write (i.e. copy) the read data to another memory card (e.g., to memory card 18). Reading data from one memory card and copying it to another memory card is beneficial in cases where it is required or desired to back up data.

Card adapter 10 also includes a processor 26. Processor 26 processes data that is stored on memory cards 16, 18. Processor 26 may encode, decode, compress and/or decompress data before controller 22 writes it into, or reads it from, any of memory cards 16 or 18. Processor 26 may be external to controller 22 and operationally connected to controller 22. Alternatively, processor 26 may be an integral part of, or embedded within, controller 22, as illustrated in FIG. 1.

Each device (i.e., host 28, memory card 16, and memory card 18) may use or require different operating voltage(s) then card adapter 10. If two devices (e.g., card adapted 10 and memory card 16) require different operating voltages, they will not be able to communicate. Therefore, a logic circuitry 35, within controller 22, checks the voltages each device uses or requires and, if required, adapts the voltages as needed. Logic circuitry 35 is powered up by voltage coming from host 28, for example via power line P'.

The voltage(s) adaptation may be implemented as follows: After being powered by host 28, logic circuitry 35 detects or inquires memory cards 16, 18 for the operating voltage(s) that they require for proper operation. Logic circuitry 35 then instructs a voltage converter 34 to regulate or to convert, and in general to adapt, the voltage coming in from power line P' as needed. The adapted voltage is then provided to memory cards 16, 18, for example via power lines 112 and 114, respectively. For example, if host 28 provides to logic circuitry 35 a relatively high voltage (e.g., 3.3 Volt) and memory cards 16 and 18 require a relatively low voltage level (e.g., 1.8 Volt) for operation, then voltage converter 34 may utilize a voltage regulator for dropping the voltage received from host 28 from 3.3 Volt to 1.8 Volt.

According to another example, if logic circuitry 35 is powered up by low voltage (e.g., 1.8 Volt) and memory cards 16, 18 require for operation a higher voltage level (e.g., 3.3 Volt), then voltage converter 34 may utilize a charge pump to elevate the voltage received from host 28 from 1.8 Volt to 3.3 Volt.

With logic circuitry 35 adapting the voltage coming from host 28, host 28 may be allowed to operate using only a relatively low voltage level for reducing power consumption. Logic circuitry 35 may be an integral part of, or embedded within, processor 26 or voltage converter 34, or, alternatively, logic circuitry 35 may be external to processor 26 and to voltage converter 34 and be operationally connected to processor 26 and/or to voltage converter 34.

Voltage converter 34 may adapt the voltage, as discussed above, by using any power converter known in the art, including, for example, a charge pump, a voltage multiplier, a voltage divider, a voltage regulator, and the like.

Card adapter 10 may also include additional functional modules, such as compression and decompression modules, for handling data that card adapter 10 exchanges with host 28.

Card adapter 10 operates as described below. A user inserts, attaches, or connects memory cards 16 and 18 to corresponding slots on card adapter 10. It is assumed that memory card 16 has a file system FS1 and memory card 18 has a file system FS2. By way of example, memory card 16 is shown inserted into slot 30a1 and memory card 18 is shown inserted into slot 30a2. Card adapter 10 is then plugged into host 28 and a communication session is established between memory cards 16 and 18 and host 28 via card adapter 10.

Controller 22 runs a file system management that is transparent to host 28. As such, connection between different types of memory cards to different types of hosts is enabled. The file system management is facilitated, among other things, by signals that are exchanged (continually, occasionally, or intermittently) between the memory cards and controller 22 when card adapter 10 is plugged into host 28. Data and control signals to and from memory cards 16 and 18 are sent over data and control lines 100 and 102, respectively.

Card adapter 10 may operate in an operation mode that is selected by the user from one or more operation modes. Controller 22 establishes a communication channel between host 28 and memory cards 16 and 18 in a variety of ways, according to the selected operation mode of card adapter 10. In one exemplary operation mode, controller 22 establishes a communication channel between host 28 and only one memory card (memory card 16 for example) for transmitting signals between the host and this memory card. In another exemplary operation mode, controller 22 emulates on an OS (Operating System) 29 of host 28 a virtual file system Virtual FS that represents file system FS1 of memory card 16 and file system FS2 of memory card 18 and presents to host 28 a unified image of the two file systems (i.e., file system FS1 of memory card 16 and file system FS2 of memory card 18). The unified image of the first file system FS1 and the second file system FS2 of memory cards 16 and 18 presents the separate storage spaces of memory cards 16 and 18 to host 28 as a unified storage space. If, for example, host 28 wants to write data into a particular memory address belonging to the unified storage space (a memory address within the unified storage space is called herein a "virtual memory address"), controller 22 translates the particular virtual memory address into a corresponding real memory address within memory card 16 or within memory card 18. Then, controller 22 writes the data sent by host 28 to the real memory address.

The selected operating mode of card adapter 10 may be applied or set in a variety of ways: According to one embodiment, the selected operating mode of card adapter 10 is set according to the order in which the memory cards (e.g., memory cards 16 and 18) have been placed within slots 30a1 and 30a2, and/or according to the positioning (placement) of memory cards (16, 18) within slot 30a1 and slot 30a2 of card adapter 10. For example, if two memory cards are mounted or connected to card adapter 10, card adapter 10 establishes communication between host 28 and the memory card that is first mounted to card adapter 10. In another example, card adapter 10 always establishes communication between host 28 and the memory card that is inserted into a specific slot, for example into slot 30a1. Communication with the second memory card may be optionally established later, for example when the first memory card runs out of storage capacity, for backup purpose, etc. According to another example, if the two memory cards are mounted simultaneously on card adapter 10, card adapter 10 emulates on the host's operating system (i.e., OS 29 of host 28) a virtual file system (e.g., Virtual FS 24) that represents a unified image of file system FS1 and file system FS2, as discussed above.

According to another embodiment, the selected operation mode of card adapter 10 is set by a switch 40 that may be a hardware switch or a software switch. Switch 40 is operationally connected to controller 22. In the example of FIG. 1 switch 40 can be in position A (as shown in full line), or in position B. Position B is shown in dotted line. A switch similar to switch 40 may have more than two positions, each position setting, or being associated with, a different operation mode of card adapter 10. Switch 40 may be operated by a user, and/or by an external device prior to mounting card adapter 10 to host 28. For example, a user may set switch 40 to position A to thereby cause controller 22 to establish a communication channel between host 28 and the memory card that is inserted, for example, into slot 30$a$1 (which in this example is memory card 16). The user can alternatively set switch 40 to position B to thereby cause controller 22 to establish a communication channel between host 28 and the memory card that is inserted into slot 30$a$2 (which in this example is memory card 18).

According to yet another embodiment the operation mode of card adapter 10 is selected or set by using a firmware or software 50. In case the transitioning between the operation modes of card adapter 10 is done by firmware or software 50, the operation mode of card adapter 10 can be selected at the time when card adapter 10 is connected to host 28 or prior to the connection of card adapter 10 to host 28.

In another embodiment, the selected operation mode of card adapter 10 may be set according to the type (e.g., storage capacity) of the memory cards that are mounted onto card adapter 10.

In a non-limiting example, two memory cards of different storage capacities are mounted onto or inserted into card adapter 10—a first memory card capable of storing 512 megabytes and a second memory card capable of storing 2 gigabytes, where the first memory card provides a faster read and write performance than the second memory card. For enhanced performance controller 22 may transfer data to and from the first (i.e., the "faster") memory card and immediately thereafter transfer the data to the second (i.e., to the "slower") memory card without waiting for the data to be fully programmed to or read from the first memory card. In other words, controller 22 may utilize the faster memory card as a buffer for temporarily storing data in a fast way until all the data is transferred to the slower memory card. By configuring controller 22 to temporarily store data on the faster memory card host 28 does not need to wait until the long programming of data to the slower memory card is finished to be able to transmit new data.

Figure 3:
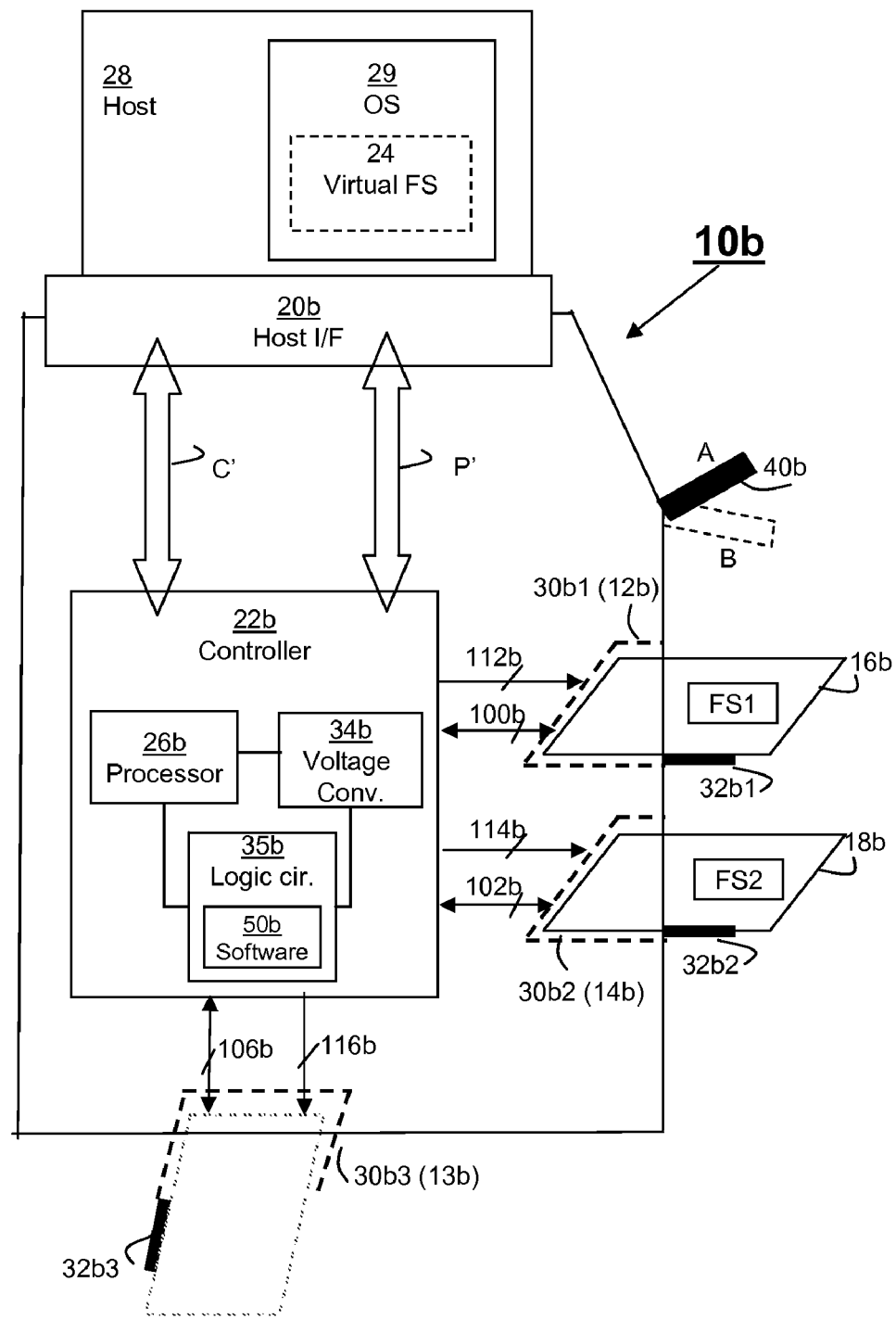
FIG. 3 is a block diagram of a card adapter according to another example embodiment.

Housing is provided within card adapter 10 for optionally retaining a first memory card (i.e., memory card 16) and second memory card (i.e., memory card 18) within card adapter 10. The housing may be any receptacle or slot, within a docking port of card adapter 10 for example, used for fully housing and securing the two memory cards (or at least a portion of the two memory cards) once inserted into card adapter 10. The housing may be a single housing, or it may include two separate housings in the form of a first slot (e.g., slot 30$a$1) and a second slot (e.g., slot 30$a$2), as shown in FIG. 1. Card adapter may include three separate slots, as shown in FIG. 3.

The memory cards may be secured within their slots by a latch mechanism, and then removable from card adapter 10, for example by using a card ejector. The ejector may include one ejector or two separate ejectors (e.g., mechanical ejectors 32$a$1 and 32$a$2). For example, an ejector mechanism and an electromechanical latch in the form of a spring-loaded push pin can be used. In this way, operation of the ejector mechanism may be controlled by a system logic that prevents unlatching a memory card from card adapter 10, for example while data is transferred to or from the memory card. Such system logic may allow unlatching a memory card only if controller 22 of card adapter 10 determines that no data is currently transferred, a condition regarded as a "safe latch condition". While in a safe latch condition, a user-initiated "release" command can unlatch the memory card, preparing it for ejection from its slot in card adapter 10.

Note that the memory cards may be optionally accessible to card adapter 10 by connecting the two memory cards to an external device and connecting the external device (either via a wired or a wireless connection) to card adapter 10. The external device to which the memory cards can be connected may be, for example, a card reader.

Figure 2:
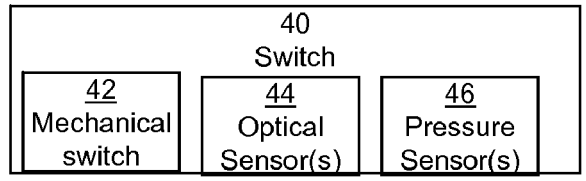
FIG. 2 shows different ways for implementing a switch of a card adapter.

FIG. 2 shows different ways for implementing switch 40. FIG. 2 will be described in association with FIG. 1. Switch 40 may be or include a mechanical switch 42, with or without a related electronic circuitry, that can be set to one of a plurality of available mechanical positions, or push buttons that are depressible for setting the card adapter to an operation mode and releasable for setting a different operation mode.

Switch 40 may be, or it may include, an optical sensor(s) 44 and/or a pressure sensor(s) 46, each optical sensor and optical sensor being designed to transition between the different operation modes of card adapter 10 depending, for example, on the order in which the memory cards are mounted onto or within card adapter 10. Optical sensor(s) 44 may be or include a light sensor that can be covered for setting one operation mode and exposed for setting another operation mode. Pressure sensor(s) 46 may be or include a capacitive sensor. The capacitive sensor may be manipulated (e.g., held, rotated, etc.) to set the desired operation mode of the card adapter. For example, rotating the capacitive sensor clockwise sets one operation mode while rotating the capacitive sensor counterclockwise sets another operation mode.

Mechanical switch 42, optical sensor 44 and pressure sensor 46 may be located anywhere on card adapter 10. For example they can be located or reside on the housing of card adapter 10 (e.g., they can be located or reside on slot 30$a$1 and/or slot 30$a$2 of card adapter 10).

FIG. 3 is a block diagram of a card adapter 10$b$ according to another embodiment. FIG. 3 will be described in association with FIG. 1. Card adapter 10$b$ includes a host interface 20$b$; a controller 22$b$; a voltage converter 34$b$; a processor 26$b$; a logic circuitry 35$b$; and an optional switch 40$b$, which respectively function in a similar way as host interface 20; controller 22; voltage converter 34; processor 26; logic circuitry 35 and switch 40 of card adapter 10.

Card adapter 10$b$ includes three memory card interfaces 12$b$, 13$b$, and 14$b$ each of which is mechanically and electrically adapted to engage a memory card. By way of example, memory card interface 12$b$ engages (i.e., accommodates and interfaces) memory card 16; memory card interface 14$b$ engages (i.e., accommodates and interfaces) memory card 18, and memory card interface 13$b$ is shown unoccupied; i.e., it does not engage any memory card. As explained above, a memory card includes a file system by which files stored on the memory card can be accessed. Memory card 16 includes a file system FS1, and memory card 18 includes a file system FS2. A memory card may be retained within its respective slot by a corresponding latch mechanism, and, if desired, removed from card adapter 10$b$ by using, for example, an ejector mechanism similar to mechanical ejectors 32$b$1, 32$b$2, 32$b$3.

In FIG. 3, power is provided to the memory cards connected to card interfaces 12$b$, 13$b$, and 14$b$ via power lines 112$b$, 116$b$, and 114$b$, respectively. Controller 22$b$ manages operation of the memory cards connected to card adapter 10$b$ via data and control lines 100$b$, 102$b$, and 106$b$. Such management is effected according to a selected operation mode of card adapter 10$b$.

As discussed above, the selected operating mode of card adapter 10, and likewise of card adapter 10b, may be set in a variety of ways. For example, controller 22b of card adapter 10b may set an operation mode based on how many memory cards are connected to card adapter 10b and on which of slots 30b1, 30b2, and 30b3 the connected memory cards are mounted. For example, if two memory cards are mounted onto slots 30b1 and 30b2 and are connected to card adapter 10b via card interfaces 12b and 14b, then card adapter 10b emulates on OS 29 of host 28 a virtual file system 24 (e.g., Virtual FS) that represents a unified image of the file systems (e.g., file systems FS1 and FS2) of both memory cards.

According to another example if one memory card is mounted on slot 30b1 and another memory card on slot 30b3, then card adapter 10b always establishes a communication channel between host 28 and the memory card that is mounted onto slot 30b1. Communication with the second memory card (i.e., communication with the memory card mounted onto slot 30b3) may be optionally established later, for example according to needs, for example after the entire or most of the storage capacity of the memory card mounted on slot 30b1 is exploited.

Figure 4:
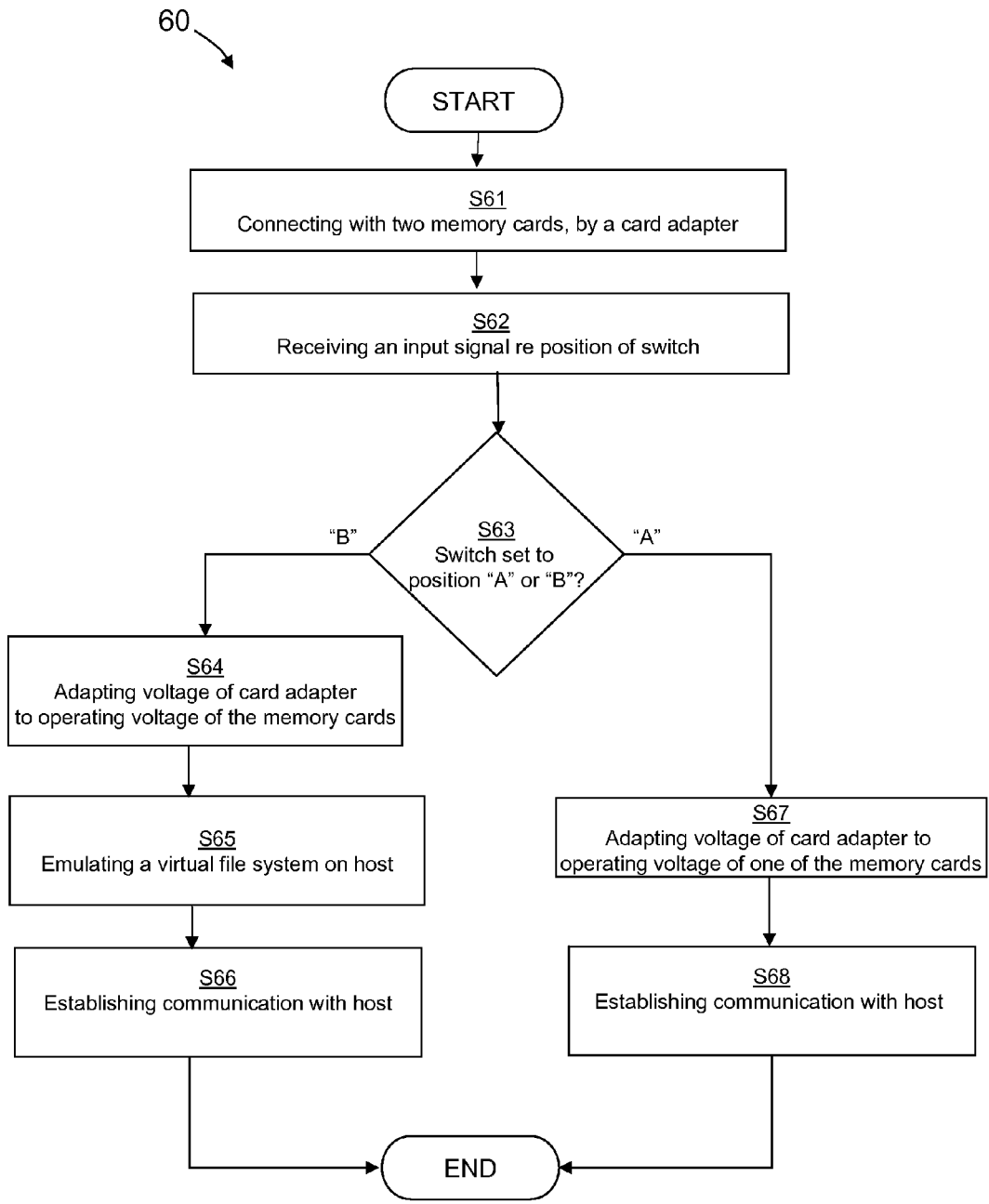
FIG. 4 shows a method by which a card adapter interfaces with memory cards and with a host, according to an example embodiment.

FIG. 4 shows a method by which a card adapter operates according to an example embodiment. FIG. 4 will be described in association with FIG. 1. Controller 22 may use the method described in connection with FIG. 4 to connect two memory cards to host 28. For brevity, the method will be described using only two memory cards 16 and 18. In addition, manipulating mechanical switch 40 facilitates selecting an operation mode and transitioning between different operation modes of card adapter 10. Typically, the selection and/or transitions are applied by a user manipulating switch 40 prior to connecting card adapter 10 to host 28.

For the sake of example it will be assumed that card adapter 10 is configured to operate in one of two predetermined modes; depending on whether switch 40 is in position "A" or in position "B". In position "A" controller 22 establishes a communication channel between a host (e.g., host 28) and a particular one of the two memory cards (e.g., the memory card connected to card interface 14); and in position "B" controller 22 emulates on host 28 a virtual file system (e.g., virtual file system 24) that represents a unified image of the first file system (FS1) and the second file system (FS2) of memory cards 16 and 18.

At step S61, two memory cards are operatively connected to card adapter 10. For example memory card 16 is connected to card interface 12 and memory card 18 is connected to card interface 14.

At step S62 a user selects the desired operating mode by switching switch 40 to the corresponding position and controller 22 receives an input signal corresponding to the position of switch 40. At step S63 controller 22 determines the position of switch 40 based on the input signal it receives from switch 40.

If controller 22 determines that switch 40 is in position "B" (shown as "B" at step S63), controller 22 employs the operating mode pertaining to position "B" and adapts, at step S64, the voltage(s) provided by card adapter 10 to the voltage(s) that is(are) required to operate both memory cards 16 and 18. At step S66 controller 22 establishes a single communication channel with host 28 and uses the virtual file system to manage data transfers from host 28 to any of memory cards 16 and 18, and vice versa, without host 28 "knowing" that separate memory cards are involved in the storage process.

Then, at step S65 controller 22 emulates, on host 28 a virtual file system that represents a unified image of the first file system (FS1) and the second file system (FS2) of memory cards 16 and 18. As explained above, the unified image of the first file system FS1 and the second file system FS2 of memory cards 16 and 18 presents the separate storage spaces of memory cards 16 and 18 to host 28 as a unified storage space.

On one hand, controller 22 presents to host 28 only virtual file system 24 that represents the separate storage spaces of memory cards 16 and 18 to host 18 as one unified storage space. On the other hand, each of memory cards 16 and 18 has its own file system. Therefore, if host 28 wants to retrieve data from, or to write data into, a particular address within the virtually unified storage space, controller 22 has to translate that address into a corresponding address either within the "real" (i.e., genuine) file system of memory card 16 or within the genuine file system of memory card 18. For example, host 28 may want to write data into a block of addresses that do not exist in any of memory cards 16 and 18 and controller 22 would have to find a real block of addresses, either in memory card 16 or in memory card 18, into which that data should be written.

In order to enable data transfers between host 28 and any of memory cards 16 and 18 even though different file systems are involved in the data transfers, controller 22 maps virtual file system 24 to the separate genuine file systems of memory cards 16 and 18 and uses this mapping to manage the data transfers. Mapping one file system into another may be implemented using Logical block addressing ("LBA"). Briefly, "LBS" is a common scheme used for specifying the location of blocks of data stored on computer storage devices. The term "LBA" can mean either the address or the block to which it refers. A logical block in modern computer systems is typically 512 or 1024 bytes long.

Referring again to step S63, if controller 22 determines that switch 40 is set to position "A", then at step S67 controller 22 adapts the voltage(s) provided by card adapter 10 to the voltage(s) required to operate only one memory card. In this example, controller 22 will adapt the voltage(s) provided by card adapter 10 to the voltage that is required to operate the memory card connected to card interface 12 (i.e., memory card 16). At step S68, controller 22 establishes a single communication channel between memory card 16 and host 28 and uses the original (i.e., the genuine) file system FS1 of memory card 16 to manage data transfers between host 28 and memory card 16.

Again, transitioning between the operation modes of card adapter 10 may be alternatively or additionally implemented by pressure sensors that may reside on the card interfaces and/or located on the housing or slot(s) that retain the memory cards to the card adapter; and/or by use of firmware or software, as discussed above.

Figure 5:
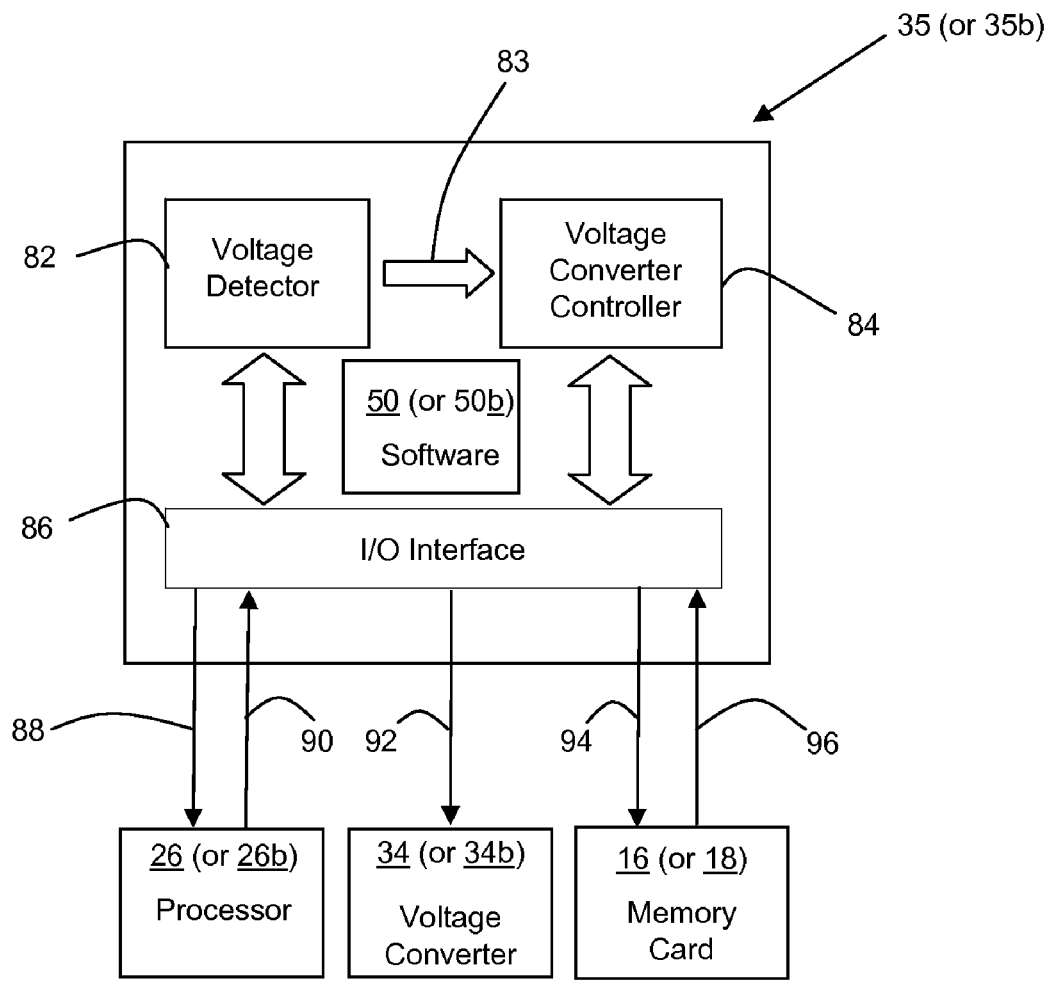
FIG. 5 is a block diagram of logic circuitry 35 of FIG. 1 and logic circuitry 35b of FIG. 3.

FIG. 5 shows a block diagram of a logic circuitry 35 (or 35b) according to an example embodiment. Logic circuitry 35 (or 35b) includes the software 50 of FIG. 1 (or the software 50b of FIG. 3), a voltage detector 82, a voltage converter controller 84, and an input-output ("I/O") interface 86. Voltage converter controller 84 provides control signals to voltage converter 34 (or to voltage converter 34b) to output voltage(s) that are required to operate a memory card. Provision of control signals by voltage converter controller 84 to voltage converter 34 (or to voltage converter 34b) is shown at 83.

After a memory card is connected to card adapter 10 (or to card adapter 10b) and controller 22 (or controller 22b) handshakes with the memory card, voltage detector 82 detects the operating voltage of the memory card. Detecting the operating voltage of the memory card may be done, for example, by trial and error. That is, it may be assumed that the memory card requires for operation the lowest voltage (i.e., 1.80 volt).

Following that assumption, voltage detector 82 outputs a corresponding signal 83 to voltage converter controller 84. Responsive to receiving the signal 83 from voltage detector 82, voltage converter controller 84 forwards to voltage converter 34 (or to voltage converter 34b) a control signal to provide 1.80 Volt to the memory card. If the memory card's operating voltage is 1.80 Volt, the memory card can operate normally, part of the normal operation being, for example, confirming to controller 22 (shown at 96) that its operating voltage is 1.80 Volt. If, however, the memory card requires for operation a higher voltage (i.e., a voltage higher than 1.80 Volt), which may be, for example, 3.30 Volt, then failing to operate normally the memory card may not be able to notify voltage detector 82 of its higher operating voltage. However, if voltage detector 82 does not receive such a notification from the memory card for a predetermined time period (e.g., for 10 seconds), voltage detector 82 assumes that the memory card needs a higher voltage. Therefore, voltage detector 82 forwards a signal (shown at 83) to voltage converter controller 84 that indicates that voltage converter 34 has to provide to the memory card the higher voltage. Therefore, voltage converter controller 84 outputs a control signal 92 to voltage converter 34 to switch the memory card's voltage from 1.80 Volt to 3.30 Volt. Voltage detector 82 may inquire the memory card (shown at 94) of its operating voltage. Processor 26 may send an inquiry 88 to voltage detector 82 (e.g., "read status") to which voltage detector 82 may respond by sending a "flag" or information that indicates the voltage-wise status of the memory card. "Voltage-wise status" refers, for example, to the operating voltage the memory card requires and to whether the required operating voltage is being provided to the memory card.

It can be seen that the embodiments, various examples of which are described above, may be realized in hardware, software, firmware or any combination thereof. A typical combination of hardware and software could be a general purpose computer system with a computer program that, when executed, controls the computer system such that it carries out the operation modes transitioning described herein.

The logic associated with the logic circuitry of the card adapters can be implemented as a computer program product that comprises all the features enabling the implementation of the embodiments described herein, and which, when loaded in a computer system is able to carry out these embodiments. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Again, the memory cards discussed herein may have a configuration that complies with any memory type (e.g. flash memory) and/or memory card format used for storing multimedia content such as audio, video, or picture files.

The host discussed herein may be a personal computer, a notebook computer, a handheld computing device, such as a Personal Digital Assistant ("PDA") or mobile handset, a cellular telephone, a camera, an audio reproducing device, or any other electronic device that works with removable data storage. A host may have various personal information management applications, such as an address book, a daily organizer, and electronic notepads, to name a few.

Memory cards are typically powered by the host (e.g., host 28) to which the card adapter (and memory cards) are connected. However, at least one of the connected memory cards may be, or may function as, an auxiliary battery pack. For those host systems (e.g., handheld computers) whose power may not adequately support add-on peripherals, the auxiliary battery pack helps to power the memory cards that are connected to the host system. Additionally or optionally, the memory cards may be powered by an external power supply that is connected to the card adapter, via one of the slots for example. In this way, the memory cards that are connected to the card adapter may be powered regardless of the host's capacity to power them.

Having described the various embodiments of systems and a method, it is to be understood that the description is not meant as a limitation, since further modifications will now suggest themselves to those skilled in the art, and it is intended to cover such modifications as fall within the scope of the appended claims.

What is claimed is:

1. A card adapter to interface between a host and a plurality of memory cards, the card adapter comprising:
    a first memory card interface configured to be connected to a first memory card, the first memory card being associated with a first file system;
    a second memory card interface configured to be connected to a second memory card, the second memory card being associated with a second file system;
    a host interface configured to connect to a host; and
    a controller operatively interposed between the first and second memory card interfaces and the host interface and configured to control the first memory card interface and the second memory card interface to control connections between each memory card that is connected thereto with the host, wherein the controller is configured to operate in each of two selectable modes, including:
        a first mode in which the controller is operative to emulate a virtual file system that presents to the host the first file system and the second file system as a unified image; and
        a second mode in which the controller presents to the host a single one of the first file system of the first memory card connected to the first memory card interface and the second file system of the second memory card connected to the second memory card interface; and
    a mode switch coupled to the controller and configured to receive a user selection of one of the two selectable modes.

2. The card adapter of claim 1, further comprising a third card interface connectable to a third memory card, the third memory card being associated with a third file system.

3. The card adapter of claim 2, wherein the controller is configured to operate in a third mode in which the controller emulates a second virtual file system presenting to the host a unified image of a file system that includes:
    at least one of the first file system and the second file system; and the third file system.

4. The card adapter of claim 1, wherein when the controller is operating in the second mode, the mode switch is further configured to select whether the controller presents to the host the first file system of the first memory card connected to the first memory card interface or the second file system of the second memory card connected to the second memory card interface.

5. The card adapter of claim 1, further comprising:
    a housing for accommodating the first memory card and the second memory card.

6. The card adapter of claim 5, further comprising:
a first mechanical ejector to eject the first memory card from the housing and a second mechanical ejector to eject the second memory card from the housing.

7. The card adapter of claim 1, further comprising:
a voltage converter operative to detect an operating voltage of at least one of the first memory card and the second memory card and to adapt the voltage provided by the host to at least one of the first memory card and the second memory card according to the detected voltage.

8. The card adapter of claim 1, wherein at least one of the first memory card and the second memory card is compatible with a mini secure digital memory card format, with a micro secure digital memory card format, or with a memory stick micro memory card format.

9. The card adapter of claim 1, wherein the mode switch includes one of:
a hardware switch including one of a mechanical switch, an optical sensor, and a pressure sensor; and
a software switch.

10. The card adapter of claim 9, wherein the switch affects the transition between the operating modes prior to or during the connection of the card adapter to the host.

11. The card adapter of claim 1, further comprising:
circuitry that is operative when the controller operates in the second mode to determine a transition between when the controller presents to the host the first file system of the first memory card connected to the first memory card interface and the second file system of the second memory card connected to the second memory card interface depending on which of the first memory card and the second memory card is connected first to the card adapter or to which memory card interface the first memory card or the second memory card is connected.

12. The card adapter of claim 1, wherein in the first mode in which the controller is operative to emulate the virtual file system, the controller is further operative to receive data from the host and store the data in the first file system of the first memory card and transfer at least a portion of the data to the second file system of the second memory card.

13. The card adapter of claim 12, wherein the first file system uses a first data format and the second file system uses a second data format that is different from the first data format, and wherein the controller converts the portion of the data from the first format to the second format when transferring the portion of the data to the second file system.

14. A method of connecting memory cards to a host using a card adapter having a first memory card interface and a second memory card interface, the method comprising:
receiving a first memory card at a first memory card interface of a card adapter, the first memory card associated with a first file system;
receiving a second memory card at a second memory card interface of the card adapter, the second memory card associated with a second file system;
controlling operation of the first memory card and the second memory card, wherein the first memory card and the second memory card are operable in each of two selectable modes including:
a first mode to emulate, by a controller of the card adapter, a virtual file system that presents to the host a unified image of a file system that includes the first file system and the second file system; and
a second mode to present one of the first file system and the second file system to the host; and
configuring the first memory card and the second memory card to operate according to a selection of one of the two selectable modes.

15. A method, comprising:
in a memory card adapter electrically coupled to a host, performing:
receiving electrical connections of each of a plurality of memory cards including a first memory card that operates at a first operating voltage and a second memory card that operates at a second operating voltage that is different from the first operating voltage;
determining the first operating voltage of the first memory card and the second operating voltage of the second memory card; and
supplying the first operating voltage to the first memory card and supplying the second operating voltage to the second memory card to enable the first memory card and the second memory card to conduct a communication session with the host via the memory card adapter.

16. The method of claim 15, wherein the communication session is a virtual file system session that emulates a unified storage space that includes first storage space at the first memory card and second storage space at the second memory card connected to the memory card adapter.

17. The method of claim 15, wherein the memory card adapter receives a card adapter operating voltage from the host that is different from at least one of the first operating voltage and the second operating voltage and converts the card adapter operating voltage to a voltage of at least one of the first operating voltage and the second operating voltage.

18. A card adapter for interfacing between a host and a number of memory cards, comprising:
a plurality of memory card interfaces each configured to connect with one of a plurality of memory cards including a first memory card having a first file system and a second memory card having a second file system;
a host interface configured to connect with a host; and
a controller operatively interposed between the host interface and the plurality of memory card interfaces and configured to control the plurality of memory card interfaces to control connections between the host and each of the plurality of memory cards connected thereto wherein the controller is operative to emulate a virtual file system that presents to the host a unified image of the first file system of the first memory card and the second file system of the second memory card connected to the card adapter, and wherein the controller is operative to transfer data between the first file system of the first memory card and the second file system of the second memory card transparently to the host.

19. The card adapter of claim 18, wherein the controller receives data from the host, stores the data in the first file system of the first memory card, and transfers at least a portion of the data to the second file system of the second memory card.

20. The card adapter of claim 19, wherein the first file system uses a first data format and the second file system uses a second data format that is different from the first data format, and wherein the controller converts the portion of the data from the first format to the second format when transferring the portion of the data to the second file system.

* * * * *